United States Patent [19]

Skoch et al.

[11] 4,265,916
[45] May 5, 1981

[54] ANIMAL FEED BLOCK CONTAINING FERROUS SULFATE AND FINELY GROUND MAGNESIUM OXIDE

[75] Inventors: Leroy V. Skoch, Manchester; Bud G. Harmon, Kirkwood; Charles W. Dickerson, Des Peres, all of Mo.; Nelson S. Chou, Kingston, R.I.

[73] Assignee: Ralson Purina Company, St. Louis, Mo.

[21] Appl. No.: 5,887

[22] Filed: Jan. 23, 1979

[51] Int. Cl.³ .............................................. A23K 1/00
[52] U.S. Cl. ..................................... 426/74; 426/623; 426/630; 426/635; 426/658; 426/807
[58] Field of Search .................... 426/69, 74, 623, 630, 426/636, 807, 658, 635

[56] References Cited

U.S. PATENT DOCUMENTS

| | | | |
|---|---|---|---|
| 3,950,546 | 4/1976 | Hill et al. | 426/74 X |
| 4,016,296 | 4/1977 | De Santis | 426/69 |
| 4,027,043 | 5/1977 | Schroeder et al. | 426/658 X |
| 4,171,385 | 10/1979 | Skoch et al. | 426/74 X |
| 4,171,386 | 10/1979 | Skoch et al. | 426/74 X |

OTHER PUBLICATIONS

Rose et al., "The Condensed Chemical Dictionary", Von Nostrand Reinhold Co., 1970, p. 576.

Primary Examiner—R. B. Penland
Attorney, Agent, or Firm—Virgil B. Hill; W. Dennis Drehkoff

[57] ABSTRACT

An animal feed supplement in a solid, weather resistant block form and method of making is disclosed. The molasses based feed supplement block, intended for consumption primarily by ruminant animals, although not limited thereto, contains ferrous sulfate as a blocking agent. The feed supplement also comprises a water absorbent clay, a phosphorous source and finely ground magnesium oxide as well as an edible fat or oil in sufficient quantities to set into a solid block when admixed with the blocking agent. A preferred block composition is prepared by a method which comprises admixing the molasses, water, phosphate source and water absorbent clay under high speed shearing action for an effective amount of time to disperse the clay, admixing edible fat and dispersing it in the mixture and then admixing ferrous sulfate and finely ground magnesium oxide to obtain a nutrient mixture. The mixture is then poured into molds or packages and solidifies to form a hard block.

36 Claims, No Drawings

ANIMAL FEED BLOCK CONTAINING FERROUS SULFATE AND FINELY GROUND MAGNESIUM OXIDE

BACKGROUND OF THE INVENTION

This invention relates primarily to an animal feed supplement and, more particularly, to improvements in an animal feed supplement in block form and the attendent method of preparation wherein the ingredients set into a solid block form within a relatively short period of time.

A common practice today is to feed animals supplemental feedstuffs or mixed rations which have been fortified with nutritive elements. The feedstuffs have been developed in block form to permit free choice feeding and reduce the labor required for mixing the nutritive supplement with the animals' feed ration. Serving as an illustration of the prior art are salt blocks, mineral blocks, protein blocks and molasses blocks.

It is known in the art to prepare hard, animal feed blocks by, for example, (a) compressing and molding a mix of hay, straw, grains and the like, with or without molasses, to a desired shape and weight or (b) evaporative heating of the ingredients. The heating may oxidize or decompose heat sensitive ingredients wherein the compressed blocks have limited amounts of energy supplying ingredients. Additionally, there are modifications of method (b), showing heating and/or emulsifying agents to disperse the energy supplying ingredients. U.S. Pat. No. 3,420,672 discloses the use of gelatinized starch as an emulsifying agent in the preparation of solid, animal feed emulsions containing molasses, fatty material, urea, phosphate, bentonite and other ingredients. U.S. Pat. No. 4,016,296 shows the use of calcium oxide with a fatty acid to form a concentration of hard soap in the feed block in order to impart hardness to the block. U.S. Pat. No. 4,027,043 discloses a molasses block containing a fat emulsifying agent and a heating step in its method of preparation to disperse the solid ingredients into the liquid ingredients.

It is accordingly believed there is a need for an economical, nutritionally balanced, hard, animal feed supplement in block form containing energy supplying ingredients that can solidify at about 80° F.

SUMMARY OF THE INVENTION

It is an object of the present invention to provide a novel animal feed supplement composition which embodies molasses as the major ingredient in a solid, weather resistant block form.

Another object of the invention is to provide a hard animal feed block containing energy supplying ingredients without emulsifying agents to disperse an suspend the energy supplying ingredients.

Another object of the invention is to provide a hard, weather resistant animal feed block which contains molasses as a major ingredient and provides a suitable medium or carrier for a variety of additional feed supplement materials, including but not limited to protein in the natural plant form, such as soy flakes, dehydrated alfalfa, soy meal, cottonseed meal, wheat midds, corn, etc; meat meals, such as fish meal; urea, biuret, etc; salt, fat in a variety of forms, and high fiber sources, i.e., rice hulls, cottonseed hulls, etc.; sugar, magnesium, calcium, clay, phosphorous and various trace elements.

And yet, another object of this invention is to provide a solid, weather resistant molasses based animal feed block which can serve as a medium or carrier for medicaments, or anthelmintics for animals with ruminant or non-ruminant digestive systems.

Another object of the present invention is to provide a novel method of making the animal supplement composition which includes the steps of providing a supplement mixture containing molasses as a major ingredient and utilizing a blocking agent, ferrous sulfate, to give the composition a hard, solid structural character. The block composition is prepared by a method which comprises admixing a major portion of molasses, water, phosphate source and water absorbent clay under high speed shearing action for an effective amount of time to disperse the clay, admixing edible fat and dispersing it in the mixture and then admixing ferrous sulfate and magnesium oxide to obtain a nutrient mixture. The mixture can then be poured into molds or packages and solidifies to form a solid hard, weather resistant block.

These and other objects and advantages will become apparent hereinafter.

DETAILED DESCRIPTION OF THE INVENTION

U.S. Pat. No. 4,171,386 is directed to an animal feed block and the preparation thereof wherein molasses, water, clay and a phosphorous source are subjected to high speed shearing action to obtain a dispersed mixture thereof; and thereafter magnesium oxide and a blocking agent, ferrous sulfate, are added to the mixture to obtain a nutrient feed block which sets to become hard and weather resistant in a short period of time. This invention involves an improvement to that product and process wherein finely ground magnesium oxide is utilized to produce a hard and more palatable feed block.

A typical formulation for the product obtained in accordance with the invention comprises the following ingredients:

| INGREDIENTS | % BY WEIGHT | PREFERRED % BY WEIGHT |
| --- | --- | --- |
| Molasses | 22-65 | 30-60 |
| Mono Ammonium Phosphate | 0-6 | 0 |
| Ammonium Polyphosphate | 5-10 | 5-6 |
| Attapulgite Clay | .5-5.0 | 1-2 |
| Water | 5-20 | 10-15 |
| Fat Source | 0-30 | 5-10 |
| Magnesium Oxide | 3.5-15 | 4-6 |
| Ferrous Sulfate | 2-8 | 2-4 |

The preferred formulation involves the use of about 4% by weight finely ground magnesium oxide and about 2% by weight ferrous sulfate.

It's also possible to add other ingredients that can be dispersed and suspended in the above formulation to create a diverse animal feed supplement. Forms of natural protein such as grains, spent soy flakes, soybean meal, cottonseed meal, peanut meal, fish meal and non-protein sources such as urea as well as various other additives may be included in the formulation such as medicaments, hormones, vitamins, minerals, antibiotics, insecticides and anthelmintics. These supplemental nutritive ingredients may be individually present in amounts ranging from about 0 to about 25% by weight.

Molasses, which is the major ingredient of the composition, can be any commercial molasses product. The molasses can be any of the sugar containing molasses such as those obtained as the by-products of the processing of sugar beets, sugar cane, corn or wood. Exemplary of these are blackstrap molasses, converted molasses, wood sugar molasses, hydrol syrup, citrus molasses and the like. Molasses has varying amounts of solids which affect its viscosity and the measure of the amount of such solids is normally given in the terms of Brix. With no intention to limit the present invention, for the consistency of the molasses that may be used has a wide variance, the Brix of commercially available molasses which may be used in the invention normally falls within the range of 60° to 90° Brix. The concentration of the molasses in the process and product of this invention is generally from about 22 to 25% by weight and preferably from about 30 to 52 percent by weight.

With respect to the clay constituent in the formulation, it is generally present in the process and product in amounts ranging from about 0.5 to about 5.0% by weight and preferably in an amount from about 1.0 to 2.0% by weight. The clay should be water absorbent and those that can be employed include attapulgite clay, bentonite, kaolin and mixtures thereof. Attapulgite clay is preferred although satisfactory results are obtained with all the aforementioned clays. Clay is believed to be a suspending agent which upon high speed shear mixing suspends and prevents segregation of the other ingredients of the formulations throughout the mixture which sets into a hard animal feed block.

The phosphorous source should be water soluble and added to the nutrient block formulation in an amount effective to aid in dispersing the water absorbent clay in such a manner to fully utilize its capabilities as a suspending agent. A preferable phosphorous source is ammonium polyphosphate. It may be the type produced for feed use and typically have the nitrogen, $P_2O_5$, $K_2O$ analysis of 10-34-0. It will be understood that the phosphorous source should be incorporated in the nutrient block on the basis of phosphorous requirement (or by weight). Desirably, ammonium polyphosphate is present in amounts ranging from about 5 to about 10% by weight. Another phosphorous source that is particularly suitable is tetrasodium pyrophosphate (M.W. 266) and is preferably present in the block formulation in amounts ranging from about 1 to about 5% by weight. For nutritional purposes, monoammonium phosphate can be added to the nutrient block formulation in amounts ranging from about 0 to 5% by weight.

The fats which may optionally be added to the nutrient block formulation include edible animal and vegetable fats and oils such as soybean oil, cottonseed oil, fish oil, grease, bleachable fancy tallow, yellow grease, beef fat and the like. The fat source used in the present invention provides energy to the animal as well as aids in the blocking process. It is present in amounts ranging from about 0 to about 30% by weight.

The blocking agent used in the nutrient block formulation is ferrous sulfate. It has been found that the presence of ferrous sulfate in the nutrient block formulation quickens the setting time of the block formulation. The reasoning for this phenomenon is not completely understood, however, it is believed that ferrous sulfate acts in a synergistic manner with magnesium oxide in the setting or hardening process to produce the nutrient feed block. Ferrous sulfate in the block formulation without magnesium oxide does not produce a hard nutrient block. Magnesium oxide in the block formulation without ferrous sulfate does produce a hard block at ambient temperatures in relatively long periods of time. The ferrous sulfate should be present in the block formulation in effective amounts to set or harden the block. Preferably, it should be present in amounts ranging from about 2 to 8% by weight, more particularly, about 2 to about 4% by weight.

A critical ingredient in the nutrient block formulation is magnesium oxide. The function of magnesium oxide in the block formulation is not completely understood, but it is believed to have water binding properties to facilitate the formation of a hard feed block. It should be present in the formulation in an effective amount to set the nutrient block within a relatively short period of time, about 24 hours at about 80° F., preferably 110° F. Preferably, the amount should range from about 3.5 to about 15% by weight, more preferably, about 4 to about 6% by weight.

The nature of the magnesium oxide used to prepare the novel feed supplement compositions of the present invention is not narrowly critical, but it is preferred that the magnesium oxide should be of a sufficient reactivity, particle size and surface area such that it produces a reasonably hard block within a relatively short period of time.

The physical properties of magnesium oxides available commercially vary a great deal with the nature of the initial material, time and temperature of decomposition and trace impurities present so that it is difficult to ascribe definite properties to the large number of products corresponding to the chemical composition MgO.

Magnesium oxide can be obtained by the thermal decomposition of all magnesium salts of volatile acids, but many commercial grades are prepared from magnesite ($MgCO_3$), magnesium hydroxide, or basic magnesium carbonate ($4MgCO_3Mg(OH)_25H_2O$).

Raw materials that may be calcined to magnesium oxide include dead-burned magnesite or sinter-magnesia. Additionally, selected grades of magnesite or sea water magnesia with certain additions may also be utilized as raw materials. Pure magnesium oxide has a sintering temperature of above 2000° C., however, the presence of impurities lowers the sintering temperature severely. Most natural magnesites contain sufficient quantities of impurities to yield a dead-burned or fluxed product at calcining temperatures of about 400° C. but the relatively pure grades of magnesium hydroxide obtained by precipitation from sea water require the addition of ferric oxide or of other additives in order to permit fluxing and recrystallization at the maximum temperatures of a kiln.

Calcining temperatures on the order of 900° C., or lower are utilized for technical grades of caustic burned magnesia. The products obtained under these conditions are reactive and may be used for the preparation of magnesium chloride, oxychloride cements, and decolorizing agents. In general, the temperatures required for rapid decomposition of magnesite are between 600° and 700° C.

Another method of producing magnesium oxide involves the precipitation of magnesium hyroxide from sea water and brine. The addition of calcine dolomite or concentrated lime slurries or even dry pulverized lime is required to be added to the sea water. Precipitation is then carried out by mixing the clarified brine or sea water with a calculated amount of calcium hydroxide and concentrating the precipitate in large settling tanks. Magnesium oxide produced from dead-burned or caustic burned magnesia is generally suitable for use in the present invention.

The term "reactivity" is used in the art as a reference to the performance of magnesium oxide in cements and refractory products. A common reactivity test involves reacting an excess of magnesium oxide with acetic acid and as a consequence the basic suspension will cause phenolphthalein indicator to turn pink. The procedure involves the following steps:

1. Weigh accurately 0.5 grams of magnesium oxide for each trial analysis.
2. Add 40 to 50 milliliters of distilled water.
3. Add 2 to 3 drops of phenolphthalein indicator.
4. Set the mixture on a magnetic stir plate and quickly add 10 milliliters of 1 N acetic acid. This should be done with a simultaneous start of a stop watch.
5. Measure the time for return of the pink color. The reactivity test, used with other indicators accurately determines the type of magnesium oxide that is suitable for the most sufficient setting or blocking of the molasses based animal feed formulation. The magnesium oxide products preferably suitable for use in the present invention have reaction times of about 8 seconds to about 3 minutes.

The setting time of the nutrient materials into a block form is dependent upon the amount, particle size, reactivity and surface area of magnesium oxide as well as the temperature. The setting time is generally reduced when the storage temperature is increased. Given these factors, the nutrient materials will set into block form at ambient temperature, preferably 80° F., and most preferably at 110° F. About 86 to 97% by weight of the magnesium oxide particles should preferably pass through a 200 mesh screen, although larger particles may be utilized in the invention but will exhibit a longer reaction time when subjected to the foregoingly described reactivity test. The rate of dissolution of a larger particle is slower because the solvent cannot quickly fill the interstitial pores on the surface of the particle. Smaller particles are more thoroughly dispersed in the solution and therefore a faster reaction occurs.

In accordance with the present invention, the surface area of the magnesium oxide particles should be above 11 meters$^2$/gm and preferably should be at least 20 meters$^2$/gm as measured by the B.E.T. procedure found in an article entitled "The Adsorption Of Gases In Multimolecular Layers", by Brunauer, S., Emmett, P. H. and Teller, E. in the *Journal of the American Chemical Society*, Vol. 60, pp. 309–316 (1938). This parameter is not intended to limit the invention, but blocking or setting of the formulation into a hard block does occur when the magnesium oxide particles have a surface area as indicated.

A convenient method of equating the amounts of the ingredients critical to the blocking or setting process of the instant invention is to form a ratio of the molar concentration of phosphorous (from the phosphorous source expressed as $P_2O_5$) magnesium (from the magnesium oxide concentration) and iron (from the ferrous sulfate concentration).

From about 0.007 to about 0.028 moles of iron, expressed as ferrous sulfate can be utilized with about 0.002 to about 0.025 moles of phosphorous source, expressed as $P_2O_5$ and preferably ammonium polyphosphate (0.012 to 0.025 moles) or about 0.002 to about 0.01 moles of tetrasodium pyrophosphate and about 0.07 to about 0.35 moles of magnesium, expressed as magnesium oxide, can be utilized to set the nutrient mixture of the present invention into a hard weather resistant molasses based animal feed block. Preferably, the iron, phosphorous source and magnesium content can be expressed as the ratio 1:0.3:10 to 1:0.9:12.5.

The interactions of water an the ingredients in the animal feed supplement are unusual. At the stated added water content of about 5–20% by weight and a molasses content of about 22 to about 65% by weight, there is sufficient free water available to aid in the convenient preparation of the block. The formulation has liquid flow properties when being mixed and becomes hard upon mixing with magnesium oxide and ferrous sulfate. The water activity ($A_w$) of the block should be at least 0.80 and not more than about 0.90. Water activity ($A_w$) is defined as the ratio of the vapor pressure exerted by the water contained in the block formulation (P) to the vapor pressure of pure water ($P_o$) at the same temperature. Water activity also can be defined as the equilibrium relative humidity (ERH) in which a food would neither gain nor lose moisture. In equation form this becomes:

$$A_w = P/P_o = ERH/100$$

The $A_w$ for pure water at any temperature above its freezing point is 1.0. The $A_w$ of any food material will be in the range of 0–1.0. The $A_w$ of conventional animal feed supplements in block form range from about 0.30 to 0.60. The $A_w$ of the present feed supplement can be in the range of about 0.80 to about 0.90. Of course, the more dry ingredients included in the product, the lower the water activity will be. The animal feed supplement in block form of the instant invention has shown stability for long periods of time, at least six months, when stored at ambient temperatures or in the field.

In accordance with the practice of the present invention, a typical process for making an animal feed block comprises mixing water, about 22 to 65% by weight molasses, and about 4 to 9% by weight phosphorous source, preferably, ammonium polyphosphate, and about 0.5 to 5% by weight water absorbent clay, preferably attapulgite, under high speed shearing action for an effective amount of time, preferably about 2 minutes, to disperse the clay, admixing animal fat, about 0 to 25% by weight nutritive ingredients, such as vitamins, minerals, etc., and possibly natural protein or non-protein nitrogen sources and then adding about 2 to 4%, preferably 2% ferrous sulfate and about 3 to about 15%, preferably 4% by weight finely ground magnesium oxide to obtain a nutrient mixture that can be poured into containers and solidifies to form a hard weather resistant block. The magnesium oxide particles should have a surface area above 11 m$^2$/gm, a reactivity time ranging from about 8 seconds to about 3 minutes and about 86 to 97% by weight of the particles should preferably pass through a 200 mesh screen.

The following are examples of some of the products which can be produced in accordance with the invention. It is to be understood that the process and products are given by way of example only, and not by way of limitation.

EXAMPLE I

This example illustrates the preparation of the animal feed block of the instant invention with varying amounts of ferrous sulfate and finely ground magnesium oxide. The ingredients were mixed in a Waring blender in the following manner: The molasses, water, phosphorous source and clay were subjected to high speed shearing action for about 2 minutes. Subsequently, the other ingredients were added with mixing and the finely ground magnesium oxide was added last in order. The nutrient mixture was prepared in 5 kilogram batches and placed in plastic cups. Six of these cups were filled per formulation. One-half of the samples were stored at 110° F., and the remaining samples were stored at ambient temperature. A sampling of the hardness of each composition at ambient and 110° F. was taken at 72 and 168 hours. The sampling was performed with an Instron ® penetration probe having a diameter of ⅜ inch and the force in pounds needed to penetrate 1 inch of the composition was recorded. Additionally, the days to reach a force of 3 pounds was also recorded for it has been arbitrarily established that a force of 3 pounds is indicative of the hardness required for a satisfactory block. The finely ground magnesium oxide was prepared by screening standard feed grade magnesium oxide through a 200 mesh screen.

The formulations are as follows:

| Ingredients (% by Wt) | FORMULATION IDENTITY | | | | | |
|---|---|---|---|---|---|---|
| | A | B | C | D | E | F |
| Ammonium Polyphosphate | 5.0 | 5.0 | 5.0 | 5.0 | 5.0 | 5.0 |
| MgO (finely ground) | 4.0 | 4.0 | 5.0 | 5.0 | 6.0 | 6.0 |
| FeSO₄ | 2.0 | 4.0 | 4.0 | 2.0 | 2.0 | 4.0 |
| Water | 15.0 | 15.0 | 15.0 | 15.0 | 15.0 | 15.0 |
| Attapulgite Clay | 1.5 | 1.5 | 1.5 | 1.5 | 1.5 | 1.5 |
| Bleachable Fancy Tallow | 5.0 | 5.0 | 5.0 | 5.0 | 5.0 | 5.0 |
| Molasses | 50.5 | 48.5 | 47.5 | 49.5 | 48.5 | 46.5 |
| CaCO₃ | 2.0 | 2.0 | 2.0 | 2.0 | 2.0 | 2.0 |
| Soybean Meal | 15.0 | 15.0 | 15.0 | 15.0 | 15.0 | 15.0 |

The following table describes the results of the hardness evaluation.

TABLE I

| | FORCE IN LBS TO PENETRATE ONE INCH | | | | |
|---|---|---|---|---|---|
| Formulation | Days to Reach A Force of 3 lbs At Ambient Temp. | 72 hours Ambient Temp. | 110° F. | 168 hours Ambient Temp. | 110° F. |
| A | 6 | 1.8 | 10.4 | 9.3 | 11.5 |
| B | 6 | 0.8 | 10.1 | 7.6 | 11.2 |
| C | 6 | 2.0 | 27 | 22.2 | 29 |
| D | 3 | 4.9 | 22 | 21.2 | 25 |
| E | 3 | 7.6 | 37.5 | 36.0 | 37 |
| F | 3 | 4.8 | 49 | 41.3 | 49 |

The results indicate that the blocks produced have satisfactory hardness.

EXAMPLE II

Eight samples of magnesium oxide were subjected to a well-known reactivity test and the surface area of each sample was determined. The reactivity test described previously was utilized in this experiment.

Magnesium oxide reacts with acetic acid:

$$MgO + 2CH_3CO_2H \rightarrow Mg(CH_3CO_2)_2 + H_2O$$

when there is an excess of the magnesium oxide, the reaction proceeds as follows:

Consequently, the basic suspension will cause phenolphthalein indicator to turn pink.

One half gram of each sample of magnesium oxide was mixed with 40 to 50 ml of distilled water. Two to three drops of phenolphthalein indicator were added until each suspension turned pink. The mixture was stirred and 10 ml of 1 N acetic acid was added and the time for the return of the pink color was recorded by a stop watch.

The surface area of each sample was measured by the B.E.T. procedure, which is described in an article entitled "The Adsorption Of Gases In Multimolecular Layers", by Brunauer, S., Emmett, P. H. and Teller, E., in the *Journal Of The American Chemical Society*, Vol. 60, pp. 309–316 (1938).

The following table indicates the results of the tests.

TABLE II

| Sample | Particle Size | Surface Area (M²/gm) | Reaction Time |
|---|---|---|---|
| A | Unscreened | 1.5 | 22 min. |
| B | Unscreened | 23.0 | 31 ± 2 sec. |
| C | Unscreened | 55.3 | 10 ± 2 sec. |
| D | Unscreened | 11.00 | 57 ± 3 sec. |
| E | Unscreened | 26.6 | 17 ± 2 sec. |
| F | 100 mesh | 33.5 | 2 min. 35 sec. |
| G | 230 mesh | 29.0 | 44 sec. |
| H | Unscreened | 26.7 | 19 sec. |

The table shows the reaction time of ten millequivalents of acetic acid upon 12.4 millequivalents of magnesium oxide.

There is an inverse correlation between the surface area of magnesium oxide particles and the reactivity. When the surface area is low, as in the case of Sample A, the reactivity is quite long, 22 minutes. Likewise, when the surface area is higher, such as 55.3 m²/gm in Sample C, the reactivity is only 10 seconds.

EXAMPLE III

The magnesium oxide samples shown in Example II were placed in formulation "A" of Example I in an amount of 4% by weight. Ferrous sulfate was added in an amount of 2% by weight and the mixing procedure in Example I was followed to produce the molasses-based block. All magnesium oxide samples except A and D set to become hard blocks.

EXAMPLE IV

This example illustrates the preparation of the molasses-based feed block containing finely ground magnesium oxide and a natural protein source and its acceptance by beef cattle relative to the molasses-based feed block prepared according to the process described in U.S. Pat. No. 4,171,386. Twenty mature crossbred cows weighing about 1000 lbs each were placed in pens in groups of five. A good quality grass hay way fed on a free choice basis. Blocks consisting of the following formulations were available to the cows at all times. The average feeding period was two weeks. The blocks were rotated to a different group of cows at the end of each feeding period.

| INGREDIENTS | FORMULATION PER CENT BY WEIGHT | | |
|---|---|---|---|
| | A* | B* | C |
| Water | 15.0 | 15.0 | 15.0 |
| Molasses | 35.8 | 30.6 | 42.4 |
| Ammonium Polyphosphate | 0 | 0 | 5.0 |
| Monoammonium Phosphate | 4.5 | 6.0 | 0 |
| Attapulgite Clay | 1.5 | 1.5 | 1.5 |
| Dry Urea | 7.3 | 7.0 | 7 |
| Calcium Carbonate (80X) | 1.7 | 1.7 | 2.9 |

-continued

| INGREDIENTS | FORMULATION PER CENT BY WEIGHT | | |
|---|---|---|---|
| | A* | B* | C |
| Trace Minerals | 0.2 | 0.2 | 0.2 |
| Vit A-D Conc. | 0.011 | 0.011 | 0.011 |
| Bleachable Fancy Tallow | 5.0 | 5.0 | 5.0 |
| Ground Soybean Meal, 49% | 15.0 | 15.0 | 15.0 |
| Magnesium Oxide | 3.0 | 7.0 | 0 |
| Finely Ground MgO Surface Area 26.6 M$^2$/gm Reaction Time 17 sec. | 0 | 0 | 4.0 |
| Ferrous Sulfate | 8.0 | 8.0 | 2.0 |
| Sodium Chloride | 3.0 | 3.0 | 0 |

*From copending application Ser. No. 893,736.

The ingredients were mixed in a Vac-U-Mac ® high shear turbine mixer with a turbine tip speed about 5250 ft./minute manufactured by Bard & Bard Company, Joplin, Missouri in the following sequence: water, molasses, monoammonium phosphate or ammonium polyphosphate—mixed 10 seconds, attapulgite clay—mixed 2 minutes, dry urea—mixed 1 minute, bleachable fancy tallow—mixed 15 seconds, calcium carbonate, trace minerals, vitamins—mixed 10 seconds, sodium chloride—mixed 10 seconds, ferrous sulfate—mixed 10 seconds, soybean meal—mixed 10 seconds and magnesium oxide—mixed 1 minute. Each mixture was then poured into molds which set to become hard feed blocks.

The results show that the block prepared with finely ground magnesium oxide was more readily accepted by the crossbred cows than the block disclosed in U.S. Pat. No. 4,171,386.

| | FORMULATION | | |
|---|---|---|---|
| | A | B | C |
| TIME | Consumption, lbs/head daily | | |
| First period | 1.39 | 1.36 | 2.98 |
| Second period | 2.15 | 1.47 | 2.76 |
| Third period | 1.61 | 1.17 | 2.23 |
| Fourth period | 1.63 | 1.06 | 2.11 |
| Fifth period | 1.47 | 0.85 | 2.56 |
| Average | 1.65 | 1.23 | 2.47 |

Block "C" made according to the instant invention was left exposed to the weather and remained stable for at least nine months without any signs of deterioration or mold growth.

EXAMPLE V

This experiment shows the intake and performance data of the block prepared as formulation A of Example I and a conventional molasses-based animal feed block prepared by compression means.

The conventional block had the following formulation.

| INGREDIENTS | % BY WEIGHT |
|---|---|
| Cottonseed Meal | 23.84 |
| Sodium Chloride | 13.5 |
| Corn | 12.5 |
| Molasses | 12.0 |
| Wheat Midds | 10.0 |
| Dehydrated Alfalfa | 10.0 |
| Calcium Carbonate | 5.0 |
| Dicalcium Phosphate | 6.0 |
| Urea | 4.0 |
| Magnesium potassium sulfate | 2.05 |
| Magnesium Oxide | 0.9 |
| Vit A & D premix | 0.011 |

-continued

| INGREDIENTS | % BY WEIGHT |
|---|---|
| Trace Mineral | 0.2 |

Twenty four Holstein heifers were divided evenly, and Group A received the conventional block and Group B received the block containing ferrous sulfate and finely ground magnesium oxide. Forty pounds of corn silage and ten pounds of pasture hay was fed to each group daily. The blocks were fed on a free choice basis. The study lasted eight weeks.

The following table shows the results of the feeding study. A projected daily weight gain was set at 1.8 lbs.

| | Conventional Block Group A | Formulation A of Example I Group B |
|---|---|---|
| Number of Heifers | 12 | 12 |
| Daily gain, lb. | 1.76 | 1.99 |
| Block Intake, lb. | 2.25 | 3.06 |
| Corn Silage Intake, lb. | 39.0 | 39.3 |
| Grass Hay Intake, lb. | 4.12 | 4.08 |

The block of the instant invention not only proved to be more palatable in this study, but also showed superior performance or weight gain over the conventional block.

It has been found that the method and compositions of this invention are effective to provide a convenient animal feed supplement. The molasses-based compositions are stable, hard, weather resistant and palatable but still provide means to administer medicaments or provide high levels of protein to the animal. The animal feed blocks have acceptable hardness and improved palatability over prior art feed blocks.

While the invention has been described in connection with specific embodiments, it will be understood that it is capable of further modifications, and this application is intended to cover any variations, use or adaptions of the invention following, in general, the principles of the invention and including such departures from the present disclosure as come within the known or customary practice in the art to which the invention pertains and as may be applied to the essential features hereinbefore set forth, and as fall within the scope of the invention.

What is claimed is:

1. A process for preparing a molasses based animal feed block which comprises admixing molasses, nutritive ingredients, about 5 to about 10% by weight of a phosphorous source, and water absorbent clay with about 2 to about 4% by weight ferrous sulfate and about 3.5 to about 15% by weight finely ground magnesium oxide having a surface area greater than 11 m$^2$/gm under high speed shearing action to obtain a nutrient mixture that solidifies to form a hard, weather resistant block.

2. A process for preparing a molasses based animal feed block which comprises admixing molasses, nutritive ingredients, from about 1 to about 10% by weight of a phosphorous source and water absorbent clay under high speed shearing action for an effective amount of time to disperse the clay, admixing fat, from about 2 to about 4% by weight ferrous sulfate and about 3.5 to about 15% by weight finely ground magnesium oxide having a surface area greater than 11 m$^2$/gm to obtain a nutrient mixture that solidifies to form a hard weather resistant block.

3. The process of claim 2 wherein the finely ground magnesium oxide has a surface area of at least 20 m$^2$/gm.

4. The process of claim 3 wherein the finely ground magnesium oxide has a reaction time of about 8 seconds to about 3 minutes.

5. The process of claim 2 wherein 4% magnesium oxide is present.

6. The process of claim 2 wherein about 4% by weight finely ground magnesium oxide and about 2% by weight ferrous sulfate is present.

7. The process of claim 2 wherein the phosphorous source is water soluble and selected from the group consisting of ammonium polyphosphate and tetrasodium pyrophosphate.

8. The process of claim 7 wherein ammonium polyphosphate is present in amounts ranging from about 5 to 10% by weight.

9. The process of claim 2 wherein the phosphorous source is tetrasodium pyrophosphate present in amounts ranging from about 1 to 5% by weight.

10. The process of claim 2 wherein the molar ratio of iron to phosphorous to magnesium ranges from 1:0.3:10 to 1:0.9:12.5.

11. A process for preparing an animal feed block which comprises mixing about 22 to about 65% by weight molasses, about 5 to about 10% by weight of a phosphorous source and about 0.5 to about 5% by weight water absorbent clay under high speed shearing action for an effective amount of time to disperse the clay, admixing fat, from about 2 to about 4% by weight ferrous sulfate and from about 3.5 to about 15% by weight finely ground magnesium oxide having a surface area greater than 11 m$^2$/gm to obtain a nutrient mixture that solidifies to form a hard, weather resistant block.

12. The process of claim 11 wherein the finely ground magnesium oxide has a surface area of at least 20 m$^2$gm.

13. The process of claim 11 wherein the reaction time of the finely ground magnesium oxide is about 15 seconds to about 3 minutes.

14. The process of claim 11 wherein about 4% by weight magnesium oxide is present in the mixture.

15. The process of claim 11 wherein about 2% by weight ferrous sulfate is present in the mixture.

16. The process of claim 11 which includes an edible fat source in an amount of from about 5 to about 30% by weight.

17. The process of claim 11 wherein the phosphorous source is ammonium polyphosphate.

18. The process of claim 11 wherein about 0 to about 25% supplemental nutritive ingredients are present in the mixture.

19. The process of claim 11 wherein the particles of magnesium oxide pass through a 200 mesh screen.

20. A molasses based animal feed block comprising a mixture of molasses, nutritive ingredients, about 1 to about 10% by weight of a phosphorous source and water absorbent clay, with about 2 to about 4% by weight ferrous sulfate and about 3.5 to about 15% by weight finely ground magnesium oxide having a surface area greater than 11 m$^2$/gm, said block being solid, weather resistant and palatable.

21. The composition of claim 20 wherein magnesium oxide has a surface area of at least 20 m$^2$/gm.

22. The composition of claim 20 wherein the magnesium oxide has a reaction time of about 8 seconds to about 3 minutes.

23. The composition of claim 20 wherein the magnesium oxide is present in the amount of about 4% by weight.

24. The composition of claim 20 wherein the ferrous sulate is present in the amount of about 2% by weight.

25. The composition of claim 20 wherein the water activity ranges from 0.80 to 0.90.

26. The composition of claim 20 wherein the particles of magnesium oxide pass through a 200 mesh screen.

27. The composition of claim 20 containing a phosphorous source selected from the group consisting of ammonium polyphosphate and tetrasodium pyrophosphate.

28. The composition of claim 20 wherein ammonium polyphosphate is present in amounts ranging from about 5 to about 10% by weight.

29. The composition of claim 20 wherein tetrasodium pyrophosphate is present in amounts ranging from about 1 to about 5% by weight.

30. The composition of claim 20 wherein the molar concentration of iron to phosphorous to magnesium is expressed as the ratio 1:0.3:10 to 1:0.9:12.5.

31. An animal feed block comprising about 22 to 65% by weight molasses, about 3.5 to about 15% by weight finely ground magnesium oxide, having a surface area greater than 11 m$^2$/gm, about 2 to about 4% by weight ferrous sulfate, about 0.5 to 5% water absorbent clay, about 5 to 10% by weight phosphorous source, water and about 5 to about 30% fat source; said block being solid, weather resistant and palatable.

32. The composition of claim 31 wherein the finely ground magnesium oxide has a surface area of at least 20 m$^2$/gm.

33. The composition of claim 31 wherein the magnesium oxide has a reaction time of about 8 seconds to about 3 minutes.

34. The composition of claim 31 wherein the water activity ranges from about 0.80 to 0.90.

35. The composition of claim 31 wherein the particles of magnesium oxide pass through a 200 mesh screen.

36. The composition of claim 31 wherein about 4% finely ground magnesium oxide and about 2% ferrous sulfate is present.

* * * * *